Figure 1:
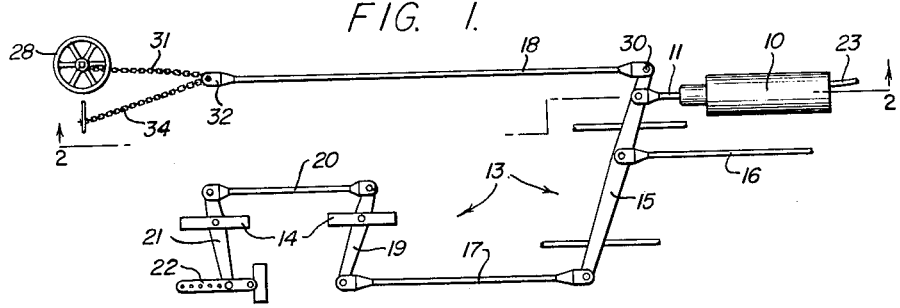

Nov. 3, 1964    L. R. ANDERSON    3,155,201
BRAKING SYSTEM FOR RAILROAD CARS
Filed Sept. 10, 1962

INVENTOR.
LEONARD R. ANDERSON

BY *Mallinckrodt and Mallinckrodt*
ATTORNEYS

United States Patent Office 3,155,201
Patented Nov. 3, 1964

3,155,201
BRAKING SYSTEM FOR RAILROAD CARS
Leonard R. Anderson, Midvale, Utah, assignor to Kennecott Copper Corporation, New York, N.Y., a corporation of New York
Filed Sept. 10, 1962, Ser. No. 222,474
1 Claim. (Cl. 188—265)

The invention is a new combination of braking equipment for railroad cars in order to achieve highly useful results heretofore impossible.

It is often necessary to uncouple one or more cars from an operating train of railroad cars and leave it or them standing free for extended periods of time. This is especially true in instances of private industrial railroad lines serving a particular industry, as for example where metallurgical concentrates are hauled by rail from a mill to an adjacent smelter.

The various types of freight cars ordinarily employed by railroads, e.g. box cars, gondola cars, hopper cars, tank cars, etc., are customarily equipped with hand brakes for manual operation when it is not possible to employ the usual air brakes. Thus, the hand brake of a car is applied whenever the car is separated for any significant length of time from the engine—which is the main source of braking air—under circumstances requiring the car to remain stationary.

The conventional hand brake is operated by manually turning a handwheel located at the top and at one end of the car. The handwheel is rigidly fastened to the upper end of a shaft or staff, which has a brake chain attached near its lower end so that turning of the handwheel in one direction winds the chain on such shaft or staff to apply the car brakes and turning of the handwheel in the opposite direction unwinds such chain and releases the car brakes, it being understood that the opposite end of the chain is attached to the brake rigging.

Manual application of the brakes by means of the handwheel is a slow and arduous task, usually requiring the use of a stout wooden club to supply additional leverage in turning the handwheel during application of the brakes.

In instances of gondola and hopper cars used to transport wet, finely divided materials, such as metallurgical concentrates, the exposed ratchet mechanism associated with the shaft or staff to retain the brake in its applied position becomes clogged with spilled material and fails to operate. Maintenance often poses such a problem that the hand brakes are removed from the cars, and wedges or railroad ties are placed in front of the running wheels as track obstructions to prevent runaways when cars are standing idle, disconnected from the engine.

Principal objects in the making of the present invention were to provide a braking system which would avoid the need for the conventional hand brake and permit it to be eliminated, without requiring the substitution of such unreliable, inconvenient, and often dangerous braking means as the aforementioned track obstructions; to provide positive and convenient, hand-controlled braking for a railroad car which has been disconnected from an engine; and to provide these in a simple and inexpensive manner.

An outstanding feature of the invention is the utilization of the normal power brake as a substitute for the conventional hand brake, even though a car is disconnected from the engine and no adequate power is available. This is accomplished in an extremely simple manner by providing for latching the customary air brake piston in its extended, brake-applying position, either before the car is uncoupled from the engine or sufficiently soon thereafter for the air brakes to become inactive. Latching is advantageously carried out by means of a chain, attached to the air brake piston rod, and a keeper for the chain in the retracted position it assumes when the air brake piston rod is extended to its brake-applying position.

A specific embodiment, representing what is presently regarded as the best mode of carrying out the invention, is illustrated in the accompanying drawing. From the detailed description of this, other more specific objects and features of the invention will become apparent.

Figure 2:
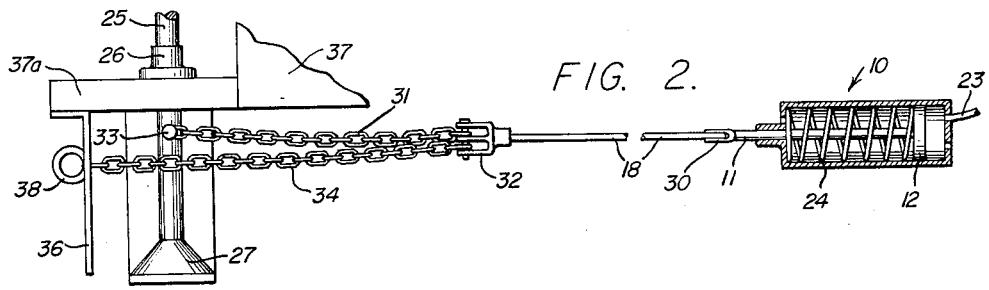
Figure 3:
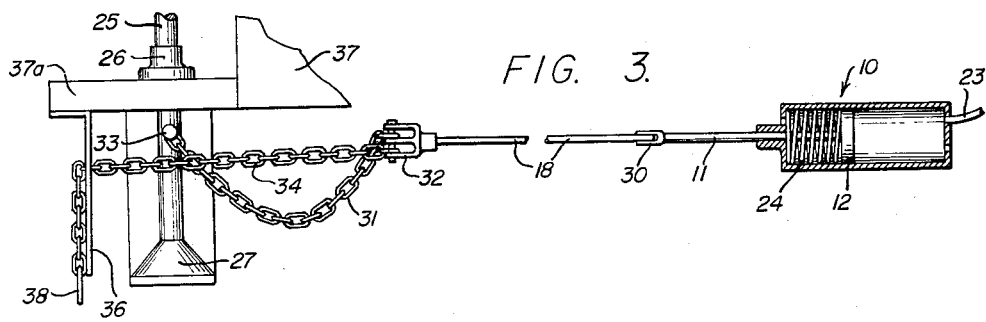
Figure 4:
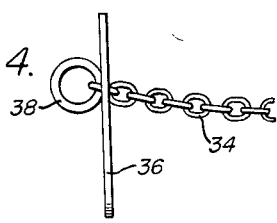
Figure 5:
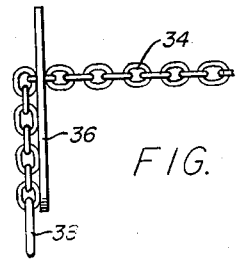
Figure 6:
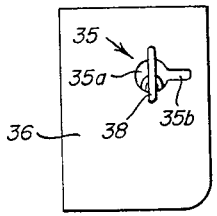

In the drawing:

FIG. 1 is a schematic representation in top plan of a braking system of the invention provided as an auxiliary to the conventional hand brake, the brake being in its "off" position;

FIG. 2, a vertical section taken on the line 2—2 of FIG. 1 showing the novel latching feature of the system in elevation;

FIG. 3, a similar view with the brake in "on" position;

FIG. 4, a fragmentary view corresponding to the left-hand portion of FIG. 2 but considerably enlarged and showing only the latching structure;

FIG. 5, a view similar to that of FIG. 4 but taken with respect to FIG. 3;

FIG. 6, a front elevation of the structure shown in FIG. 4; and

Figure 7:
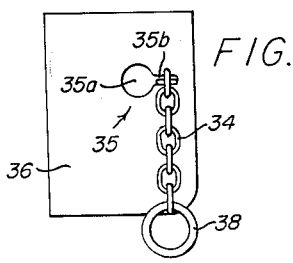

FIG. 7, a front elevation of the structure shown in FIG. 5.

Referring to the drawing:

The braking system illustrated is, generally speaking, of conventional type and construction. Thus, a standard air brake cylinder 10 has the push rod 11 of its piston 12, FIGS. 2 and 3, connected by the usual brake rigging 13 to brake beam fulcrums 14 carrying a brake beam and breake shoes (not shown) in customary manner.

The brake rigging includes a brake or cylinder lever 15, to which the push rod 11 is pivotally connected in the usual manner, along with a cylinder rod 16, a top truck rod 17, and a hand brake rod 18. Top truck rod 17 pivotally connects at its other end to a truck line lever 19, which carries one of the brake beam fulcrums 14 and is pivotally connected to a bottom rod 20. Such bottom rod is pivotally connected in customary manner to a truck dead lever 21, which carries the other brake beam fulcrum 14 and a dead lever fulcrum 22.

With this conventional braking system, the introduction of pressure air into cylinder 10 through supply pipe 23 pushes piston 12 against the urge of spring 24 and extends push rod 11, thereby applying the car brakes by means of the aforedescribed conventional brake rigging.

Also conventional is the provision, in this illustrated instance, of a hand brake, which includes a vertical brake staff 25, FIGS. 2 and 3, journaled in sleeve bearing 26 and end bearing 27 and having a handwheel 28 rigidly secured to its upper end to enable manual turning of such brake staff. Such hand brake also includes the usual hand brake rod 18, having an end pivotally attached to brake or cylinder lever 15, as at 30, and a chain 31, having one end attached to the opposite end of hand brake rod 18, as by means of clevis 32, and its other end attached to the lower portion of brake staff 25, as by means of bolt 33, FIG. 2, all in essentially conventional manner.

Not conventional is the provision of manually operable latching means for holding push rod 11 in brake-applied position following any given powered application of the brakes.

In this illustrated embodiment of the invention, such latching means comprises a latch chain 34, having one of its ends attached to such opposite end of hand brake rod 18, as by means of the clevis 32 (which is conveniently of double construction for the purpose), and having the other end portion passed through a keyhole-configurated aperture 35, FIGS. 6 and 7, of a latch plate 36 provided as a keeper member for the latch chain 34.

Latch or keeper plate 36 is anchored to the usual platform 37a, FIGS. 2 and 3, of car 37, advantageously as a depending bracket.

Aperture 35 is provided with a large portion 35a, through which latch chain 34 freely passes, and with a relatively elongate narrow portion 35b, into which individual links of chain 34 fit flatwise, see FIG. 7, for keeping such chain in any desired position of retraction relative to latch or keeper plate 36. An enlarged member, shown as a pull ring 38, prevents disengagement of latch chain 34 from such latch or keeper plate 36 when in extreme extended position of such chain relative to the plate.

In using the braking system of the invention, the power brakes of the train are applied in customary fashion as and when needed, it being realized that latch chain 34 is in its extreme extended position of FIGS. 4 and 6 while the car is part of an engine-powered, operating train of cars. When the car is uncoupled from the train, however, and it is desired to brake such car independently, the latch chain 34 is merely pulled taut and latched manually while the brakes are set under power. This can be either before uncoupling or promptly following uncoupling. Thus, when the air pressure or other power applied to the brake push rod is either released or dissipated, such push rod remains locked in its power-applied, extended position, with the brakes remaining set.

It can be seen that, with this arrangement, the conventional hand brake—represented by brake staff 25, handwheel 28, and chain 31—may be safely eliminated. Nevertheless, if provided, as in the present instance, latching of the brake push rod in its brake-applied position following any powered application of the brakes will make it easy to apply such conventional hand brake at any time following uncoupling and will avoid the relatively prolonged time which would be required to set the brakes by use of such conventional hand brake prior to uncoupling.

Whereas there is here illustrated and specifically described a certain preferred construction of apparatus which is presently regarded as the best mode of carrying out the invention, it should be understood that various changes may be made and other constructions adopted without departing from the disclosed inventive combinations particularly pointed out herebelow.

I claim:

A brake-operating system for railway cars equipped with air brakes, comprising a push rod; an air cylinder for extending and retracting said push rod; brake rigging connected to and operable by said push rod for applying and releasing said brakes; said rigging including a cylinder lever to which the push rod is pivotally connected, and a brake rod pivotally connected to the cylinder lever; a chain having one end connected to the brake rod and extending freely therefrom as a component of a brake lock; a latch plate, having a keyhole-configurated aperture through which the chain is passed and which is adapted to freely pass the links of said chain in one position thereof and to catch the links in another position thereof, as another component of said brake lock; a retaining handle member fixed to the free end of the chain, said member being too large to pass through said aperture; a hand brake comprising a rotatable brake staff and handwheel; and a second chain, having one end fixed to said brake rod and the other end fixed to said brake staff so that the chain will be wound thereon when the staff is rotated.

References Cited in the file of this patent

UNITED STATES PATENTS

| | | |
|---|---|---|
| 448,438 | King | Mar. 17, 1891 |
| 638,526 | Shelton | Dec. 5, 1899 |
| 734,429 | Paffuette | July 21, 1903 |
| 1,061,900 | Clelland | May 13, 1913 |
| 1,127,035 | Linam | Feb. 2, 1915 |
| 1,192,420 | Harter et al. | July 25, 1916 |
| 1,431,569 | Coffin | Oct. 10, 1922 |
| 1,547,990 | Winters et al. | July 28, 1925 |
| 1,603,745 | Camp et al. | Oct. 19, 1926 |
| 1,737,922 | Duryea | Dec. 3, 1929 |
| 2,309,734 | Klotsch | Feb. 2, 1943 |

FOREIGN PATENTS

| | | |
|---|---|---|
| 23,752 | Great Britain | Oct. 17, 1912 |
| 443,728 | France | July 20, 1912 |